(No Model.)

C. H. STRATTON.
Jump Seat for Vehicles.

No. 242,166.          Patented May 31, 1881.

Attest:
Herm. Lauten.
Wm. C. Henderson.

Inventor:
C. H. Stratton.
By H. S. Abbot.
Attorney.

UNITED STATES PATENT OFFICE.

CHARLES H. STRATTON, OF SALEM, OHIO.

JUMP-SEAT FOR VEHICLES.

SPECIFICATION forming part of Letters Patent No. 242,166, dated May 31, 1881.

Application filed March 2, 1881. (No model.)

*To all whom it may concern:*

Be it known that I, CHARLES H. STRATTON, a citizen of the United States, residing at Salem, in the county of Columbiana and State of Ohio, have invented certain new and useful Improvements in Jump-Seats; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
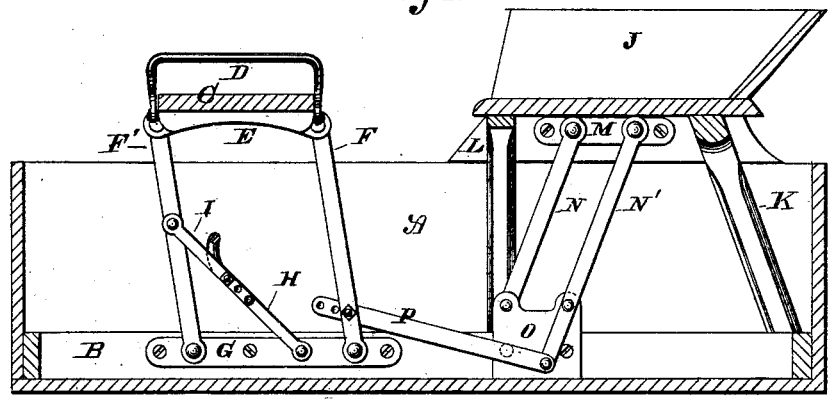
Figure 2:
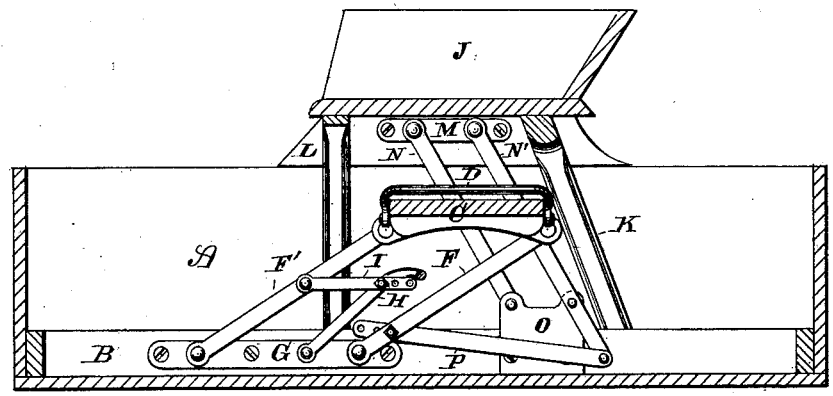
Figure 3:
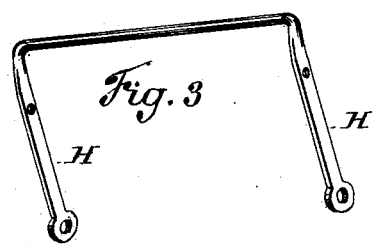
Figure 4:
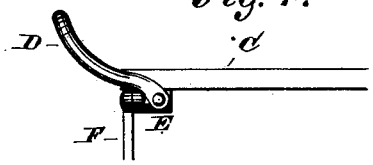

Figure 1 is a vertical longitudinal section through the vehicle-body with the seats unfolded or open. Fig. 2 is a like section with the seats folded or closed. Fig. 3 is a perspective of a bracing-rod detached from the front seat, but to be used in connection with it; and Fig. 4 is a front view of a section of the seat, showing one of the extensible arms.

My invention relates generally to jump-seat vehicles, and has reference specially to jump-seats in which one seat is moved backward and forward under and from under the other seat by moving one of the two seats; and it consists in the construction and the combination of parts hereinafter described, and then sought to be specifically defined by the claims.

In the accompanying drawings, the letter A indicates the body of the vehicle, within which, resting on its bottom and extending along the end and side panels, are the sills B.

The front seat, which is indicated by the letter C, is provided with the folding end arms, D, which when turned outwardly widen the seat, and when so turned they rest on the cross-irons E, which are bolted or otherwise secured to the seat at or near its ends, and are made to extend beyond the seat, so as to form bearings for the arms. When this seat is to be thrown back or the other seat drawn over it, the arms are turned inwardly and rest upon the top of the seat. The seat is supported by four hinged legs, F F', two under each end of the seat, which are jointed or hinged at the top to the cross-irons E and at the bottom to the plates G, which are suitably fastened to the sides of the sills B. The seat, mounted as described, is free to move back and forth and up and down, as is apparent from an inspection of Figs. 1 and 2 of the drawings.

In order to hold firmly in place the front and back seats when both are raised for use, a frame, H, is hinged by its two arms to the plates G, which are secured opposite to each other, one to each side of the body, to the sills B.

Arms I extend from near the top of legs F', to which they are hinged, down to the arms of frame H, to which they are also hinged or jointed by bolts and nuts or other suitable means. The arms I are made with a series of holes, as illustrated, so that the connection between legs F' and frame H may be lengthened and shortened and the pitch forward of the seat thereby regulated. When the seat is pushed forward the top or connecting bar of the frame will rest against or on the arms I, and thereby prevent the seat from moving back again.

The back seat, which is indicated by the letter J, is supported by the risers K, which rest upon the sills B, while the riser-panels L may touch or nearly touch the top edge of the side panels without firmly resting thereon. On the inside of each riser-panel L there is suitably secured a plate, M, to which there is jointed one end each of two rods or bars, N N', which are jointed at or near their other ends to plates O, held by screws or otherwise to the inside of the side panels or to the sills. The rods N' are longer than rods N, and are jointed above their lower ends instead of at their ends to the plates O, while to their ends are jointed one end each of the two levers P, which extend from rods N' to legs F of the front seat, where they are connected by bolts and nuts to those legs, and at that end each of the levers is provided with a series of holes, so that by changing the bolts from one hole to another the levers can be lengthened or shortened, and thereby the distance apart of the two seats regulated. The relative length of the legs to the front seat and the jointed rods to the back seat is such that the front seat will be higher than the back seat, so that the legs of the occupant of the back seat will pass under the front seat and not be cramped, as they would be if the front seat were lower.

When it is desired to use the two seats, the front seat is grasped and moved forward, which movement throws the other seat to the rear, and the parts appear as illustrated in Fig. 1; and when only one seat is needed, the front seat is moved backward, which movement folds the front seat down between the side panels of the body and draws the back seat over it, and by which it is hidden from sight. When so folded, the weight of the front seat is thrown upon the levers P and the rods of the back seat and holds the latter securely to its place.

Having described my invention, what I claim is—

1. The combination of the body of the vehicle, the seat, the legs F F', frame H, and arms I, substantially as and for the purpose set forth.

2. The seat C and its legs F F', in combination with frame H and arms I, jointed together so as to admit of extension, as and for the purposes set forth.

3. The combination of seat J, risers K, and hinged rods N N', substantially as and for the purpose set forth.

4. The seat C, having connected therewith legs F F', frame H, and arms I, in combination with seat J, having connected therewith the hinged rods N N', the two seats being connected together by the extensible levers P, whereby the several parts will operate as set forth.

In testimony whereof I affix my signature in presence of two witnesses.

CHARLES H. STRATTON.

Witnesses:
 THOMAS BONSALL,
 JOHN E. ROGERS.